(12) United States Patent
Peterson

(10) Patent No.: US 8,132,162 B2
(45) Date of Patent: Mar. 6, 2012

(54) RUNTIME MACHINE ANALYSIS OF APPLICATIONS TO SELECT METHODS SUITABLE FOR METHOD LEVEL CACHING

(75) Inventor: Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1268 days.

(21) Appl. No.: 11/773,463

(22) Filed: Jul. 5, 2007

(65) Prior Publication Data
US 2009/0013320 A1    Jan. 8, 2009

(51) Int. Cl.
*G06F 9/45* (2006.01)
(52) U.S. Cl. ......... 717/156; 717/148; 717/153; 717/154
(58) Field of Classification Search .................. None
See application file for complete search history.

(56) References Cited

U.S. PATENT DOCUMENTS

| | | | |
|---|---|---|---|
| 4,755,930 A | 7/1988 | Wilson, Jr. et al. | |
| 5,940,619 A * | 8/1999 | Abadi et al. ................. | 717/156 |
| 6,311,253 B1 | 10/2001 | Chang et al. | |
| 6,385,764 B1 | 5/2002 | Blandy et al. | |
| 6,408,384 B1 | 6/2002 | Adams | |
| 6,587,937 B1 | 7/2003 | Jensen et al. | |
| 6,874,066 B2 | 3/2005 | Traversat et al. | |
| 7,111,286 B2 * | 9/2006 | Schrader et al. .............. | 717/143 |
| 2002/0035672 A1 | 3/2002 | Challenger et al. | |
| 2002/0144019 A1 | 10/2002 | Gooding | |
| 2002/0147887 A1 | 10/2002 | Copeland et al. | |
| 2002/0188801 A1 | 12/2002 | Green | |
| 2003/0005228 A1 | 1/2003 | Wong et al. | |
| 2003/0110478 A1 | 6/2003 | Duesterwald et al. | |
| 2004/0040029 A1 | 2/2004 | Debbabi et al. | |

(Continued)

FOREIGN PATENT DOCUMENTS

EP     1316883     6/2003

OTHER PUBLICATIONS

Guest, S. Using Reflection Emit to Cache. NET Assemblies. Feb. 2002. Microsoft Corporation. [retrieved on Jan. 26, 2011]. Retrieved from the Internet: <URL: http://msdn.microsoft.com/en-us/library/ms973916.aspx>.*

(Continued)

*Primary Examiner* — Tuan Dam
*Assistant Examiner* — Geoffrey St. Leger
(74) *Attorney, Agent, or Firm* — David A. Mims, Jr.; Amy J. Pattillo

(57) ABSTRACT

A runtime machine manages a selected disk space allocated to the runtime machine by the operating system and manages a separate method cache within the selected virtual disk space. The runtime machine controls caching within the method cache of a separate result of at least one method of the application marked as cache capable. For a next instance of the method detected by the runtime machine, the runtime machine accesses the cached separate result of the method in lieu of executing the method again. The runtime machine marks a method as cache capable by analyzing the types of objects within the argument object graph and result object graph of a method. If the runtime machine detects only primitive type objects, then the runtime machine marks the method so that the result of the method will be stored in the method cache.

17 Claims, 8 Drawing Sheets

U.S. PATENT DOCUMENTS

2004/0123277 A1* 6/2004 Schrader et al. ............. 717/143
2004/0181401 A1* 9/2004 Pachet et al. ................. 704/223
2005/0066306 A1* 3/2005 Diab ............................ 717/108
2005/0257007 A1 11/2005 Moore et al.

OTHER PUBLICATIONS

Daniel Pfiefer and Peter Lockemann, "Theory and Practice of Transactional Method Caching", ACM Transactions on Programming Languages and Systems, vol. 2, Sep. 14, 2006, pp. 1-36, 36 pages.

Bakalova, R., et al., "WebSphere Dynamic Cache: Improving J2EE application performance", IBM Systems Journal, vol. 43, No. 2, 2004, pp. 351-370, 20 pages.

"How to Get Started with IBM WebSphere Application Server on Solaris 10 and Zones", Dileep Kumar and Albert Leigh, Sun Microsystems Inc, May 24, 2006, pp. 1-23.

"Explained: How does Java work?" Issue of Red Herring Magazine, Mar. 6, 2001, http://www.redherring.com/home/6264.

"How Websphere Caches Dynamic Content for High-Volume Web Sites", High-Volume Web Site Team, Dec. 15, 2002, p. 1-18.

U.S. Appl. No. 11/773,462, Robert Peterson, "Runtime Machine Supported Method Level Caching", filed Jul. 5, 2007, Assigned to International Business Machines Corporation, 39 Pages.

U.S. Appl. No. 11/773,462, filed Jul. 5, 2007, USPTO Final Office Action, mailing date Oct. 14, 2010, 23 pages.

U.S. Appl. No. 11/773,462, filed Jul. 5, 2007, USPTO Issue Fee, mailing date Jan. 10, 2011, 6 pages.

U.S. Appl. No. 13/012,272, filed Jan. 24, 2011, Filed Application.

Xiaobin, Li, Dr. Walt Scacchi, "A Formal Architecture for Open Systems", Institute for Software Research, Information and Computer Science Department, University of California, Irvine, Dec. 30, 2001, retrieved from the Internet <http://www.ece.uci.edu/~xiaobinl/OpenSource.pdf>.

Office Action, U.S. Appl. No. 13/012,272, filed Jan. 24, 2001, Robert R. Peterson, mailing date Mar. 23, 2011, 189 pages.

Office Action, U.S. Appl. No. 11/773,462, filed Jul. 5, 2007, Robert R Peterson, mailing date May 12, 2010, 19 pages.

Search Report and Written Opinion, PCT/EP2008/057202, dated Jun. 11, 2008, 9 pages.

Notice of Allowance, U.S. Appl. No. 13/012,272, filed Jan. 24, 2011, Robert R Peterson, mailing date Oct. 27, 2010, 14 pages.

* cited by examiner

RUNTIME MACHINE ANALYSIS OF APPLICATIONS TO SELECT METHODS SUITABLE FOR METHOD LEVEL CACHING

BACKGROUND OF THE INVENTION

1. Technical Field

The present invention relates in general to an improved runtime machine such as a virtual machine or interpreter. Still more particularly, the present invention relates to an improved runtime machine for analyzing applications to select methods suitable for method level caching.

2. Description of the Related Art

One consideration in application development is how to achieve performance requirements for an application across multiple hardware and software platforms. For many applications, caching data can significantly improve the performance of response times by saving computed results in a cache, associating the saved results with properties of the request, and obviating computations for subsequent similar requests by serving responses from the cache. In particular, enhanced performance may be achieved for object-oriented programming language applications by caching the outputs of methods, such as by caching a hash table generated when a method is executed.

To improve the performance of applications across multiple platforms, many applications today are written to run on cross-platform runtime machines, such as virtual machines and interpreters. Examples of virtual machines include, but are not limited to Java Virtual Machine (JVM) (Java and JVM are registered trademarks of Sun Microsystems, Inc.) and Common Language Runtime (CLR). Examples of interpreters include, but are not limited to, PERL and PYTHON. Different versions of a runtime machine are written for various computer platforms, running various operating systems, where any application written for the runtime machine can be operated on any of the platforms, instead of a developer having to produce a separate version of the application for each computer and operating system.

Typically, for a runtime machine to run atop the operating system or hardware platform and execute an application, the runtime machine requests a portion of the cache heap from the operating system and manages the allocated portion of the cache heap. Currently, however, cache management by runtime machines does not include programming language support for caching data at the method level. Thus, to implement method level caching for applications written to run on a runtime machine, users are limited to writing custom code for a particular platform to manually store results of methods in the cache, such as by manually maintaining hash maps, or users are limited to writing applications to run through an additional layer of software with specialized libraries or APIs which control caching, where the additional layer of software runs atop the runtime machine.

Requiring a user to customize code for a platform for manual caching or to implement an additional software layer which supports method level caching, however, overlooks the goal of reusability of one version of an application across multiple platforms running on top a runtime machine at each platform. A user may write customized code to manually control method level caching based on the cache size, cache scheme and cache coherence for one platform, but for a different platform the code would have to be rewritten to provide enhanced performance on that platform. Further, a user may write customized code with caching commands for method level caching supported by a specialized software layer, but then for the application to run on a particular platform, that additional software layer is required in addition to the runtime machine.

Moreover, not all methods are suitable for caching in general or may not be efficiently cached on a particular platform. Therefore, there is a need for a method, system, and program for supporting fine-grained, method level caching through a runtime machine, in the portion of the cache heap allocated to the runtime machine. In particular, there is a need for a runtime machine which analyzes methods of an application and marks methods which are suitable for caching.

SUMMARY OF THE INVENTION

Therefore, the present invention provides, in general, an improved runtime machine, such as a virtual machine or interpreter, which supports analysis of methods to determine which method results are suitable for caching and supports caching of method results.

In one embodiment, a computer system includes a disk space comprising at least one type of memory and an operating system for controlling allocations and access to the disk space. A runtime machine includes a virtual machine controller or interpreter controller to run applications through at least one of the operating system or directly on at least one processor of the computer system. In addition, the runtime machine manages a selected virtual disk space allocated to the runtime machine by the operating system and manages a separate method cache within the selected virtual disk space. The runtime machine controls caching within the method cache of a separate result of at least one method of the application marked as cache capable. For a next instance of the method detected by the runtime machine, the runtime machine accesses the cached separate result of the method in lieu of executing the method again. The runtime machine marks a method as cache capable by analyzing the types of objects within the argument object graph and result object graph of a method. If the runtime machine detects only primitive type objects, then the runtime machine marks the method so that the result of the method will be stored in the method cache.

In one example, the virtual machine controller compiles the source code of the application into bytecode to be executed. While compiling the source code into bytecode, the controller generates object graphs for the arguments and result of each method of the application and analyzes the object graphs to detect whether the object graphs include non-primitive type objects which are not resolvable if cached. Responsive to detecting that the object graphs only includes primitive type objects, the controller marks the method within the bytecode as cache capable to direct the controller, at runtime, to cache the result of the method in the method cache.

In another example, when the virtual machine controller executes compiled bytecode or the interpreter controller interprets source code at runtime, the controller also analyzes the live object graphs of the arguments and result of each method to detect whether live object graphs include non-primitive type objects. By analyzing live object graphs at runtime, the runtime machine does not have the overhead of generating object graphs which occurs at compile time, however, the runtime machine may determine at runtime to defer analysis of objects until computational cycles are available for performing the analysis of live object graphs.

Examples of non-primitive object types that are not cache capable include, but are not limited to, a file access stream, a keyboard input or output object, a screen input or output object, an object that accesses a separate process, and an object that accesses the disk space not allocated to the runtime machine. In addition to the runtime machine detecting whether all the objects of a method object graph are primitive types, the runtime machine may further classify preferred primitive types.

In analyzing each object graph, the controller traverses nodes of each object graph and detects whether each node represents a primitive object type. Each node belongs to one of multiple levels of nodes. In one embodiment, each level of nodes is searched before a next level of nodes is searched in a breath-first analysis.

The runtime machine tracks the time an object graph of a method is analyzed and estimates a remaining time for analyzing the object graph. If the current analysis time or estimated remaining time for analysis exceeds one or more time limits, then the runtime machine marks the method as not cache capable and stops the analysis. In addition, the runtime machine may allow a user to select to halt analysis of a method or continue analysis when the current analysis time or estimated time exceeds one of the time limits.

The runtime machine calculates a size of an object graph of a method. If the size of the object graph exceeds a maximum object size for the method cache, then the runtime machine automatically stops analysis of the additional method and marks the additional method as not cache capable in the method cache.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
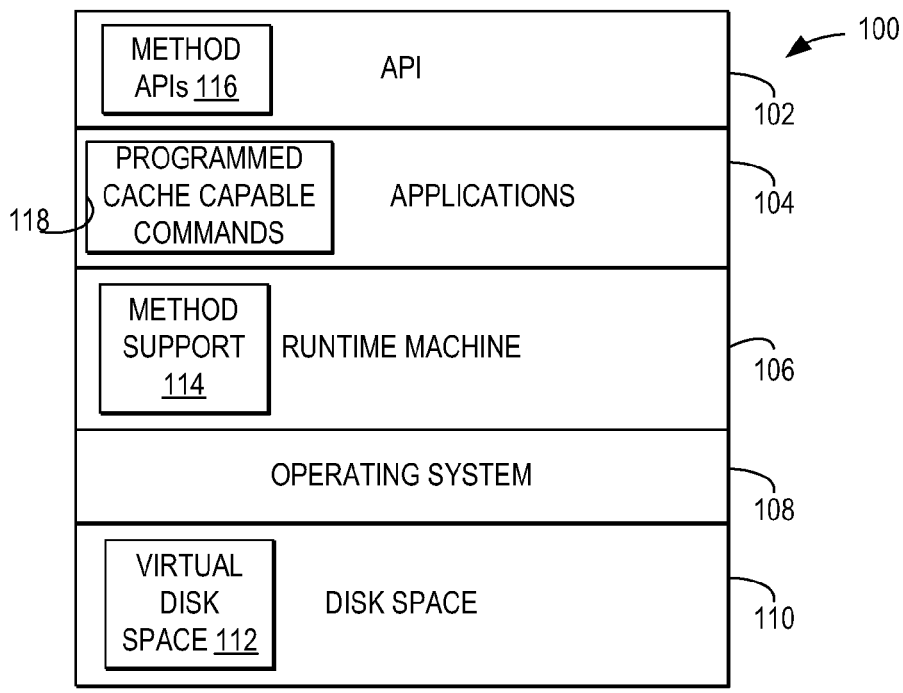
FIG. 1 is a block diagram depicting one embodiment of a stack in which a runtime machine which supports method level caching is implemented.

With reference now to the figures, and in particular, with reference now to FIG. 1, a block diagram illustrates one embodiment of a stack in which a runtime machine which supports method level caching is implemented. In the example, a stack 100 for running on a computer system or a network of computer systems includes a runtime machine 106. Runtime machine 106 provides an environment for running applications 104 through an operating system 108 or directly on a processor of a computer system (not depicted). It is important to note that as used herein, runtime machine 106 implements a virtual machine or interpreter, such as, but not limited to, virtual machines such as a Java Virtual Machine (JVM) (Java and JVM are registered trademarks of Sun Microsystems, Inc.) or Common Language Runtime (CLR), and interpreters such as PERL or PYTHON. Runtime machine 106 may also include additional functional layers for facilitating data management within a distributed network environment. Applications 104 include application code written in object-oriented programming languages supported by runtime machine 106, wherein the application code of applications 104 can run on different computer platforms through a different runtime machine specified for the each of the different platforms. As described herein, application code may refer to, but is not limited to, the source code of an application, compiled bytecode from the source code, executed bytecode or interpreted source code. Runtime machine 106 or applications 104 may also include middleware, such as Websphere (Websphere is a registered trademark of International Business Machines Corporation) or other service software layers atop which applications can run.

Operating system 108 interfaces with disk space 110, which may include cache. In one embodiment, operating system 108 allocates a portion of disk space 110 specifically for management by runtime machine 106, as illustrated by virtual disk space 112, which may also be referred to as the heap or cache allocated to runtime machine 106. Runtime machine 106 controls cache allocations and data storage within the virtual disk space 112. In addition, in controlling caching within the virtual disk space 112, runtime machine 106 may also control garbage collection or other cache management to periodically remove unused or expired data or to rearrange data to create larger blocks of unused space for allocation. Virtual disk space 112 may include either or both of physical representations and logical representations of disk space 110.

An application programming interface (API) layer 102 provides libraries and support through which applications 104, runtime machine 106, and operating system 108 may communicate with a user. API layer 102 may include API libraries packaged with runtime machine 106 for enabling a user interface through which a user may select operation parameters for runtime machine 106.

Advantageously, runtime machine 106 supports method level caching. As described herein, a "method" is used in object-oriented programming to refer to a programmed procedure which is defined as part of a class or included in any object of the class. In addition, other types of object-oriented methods may be implemented. It will be understood that runtime machine 106 may also support caching of other types of methods.

In the example, to support method level caching, runtime machine 106 includes a method support layer 114 which enables runtime machine 106 to determine whether a method is suitable for caching, to control caching of the results of cache capable methods to virtual disk space 112, and to control accesses to previously cached results of a method from virtual disk space 112.

In one example, in determining whether a method is suitable for caching, method support layer 114 directs runtime machine 106 to analyze application code for applications 104 and separate cache property files, accessible separate from application code, to detect whether a method has been marked as cache capable within the code or in the separate cache property file. In particular, method support layer 114 may include a library that defines language commands for marking a method as cache capable and for specifying an amount of time that the result of the method is valid when cached. Thus, applications 104 may include application source code that includes programmed cache capable commands marking cache capable methods or a separate cache property file may designate one or more cache capable methods, as illustrated at reference numeral 118.

In another example, advantageously, in determining whether a method is suitable for caching, method support layer 114 may direct runtime machine 106 to analyze application code for applications 104 to decide whether a method is cache capable. In addition, method support layer 114 may enable runtime machine 106, responsive to analyzing application code and deciding that a method is suitable for caching, to add commands to the application code to specify the particular method as cache capable or to add markings in a method table marking the method as cache capable.

In a further example, in determining whether a method is suitable for caching, runtime machine 106 may be packaged with method APIs 116 in API layer 102. Runtime machine 106 may call method APIs 116 to prompt a user to select whether a method is cache capable, whether to cache a cache capable method, how long to cache a cache capable method, whether to direct runtime machine 106 to halt the analysis of a particular method, whether to permit runtime machine 106 to allow analysis of a particular method to continue, and other parameters of method level caching supported by method support layer 114.

Figure 2:
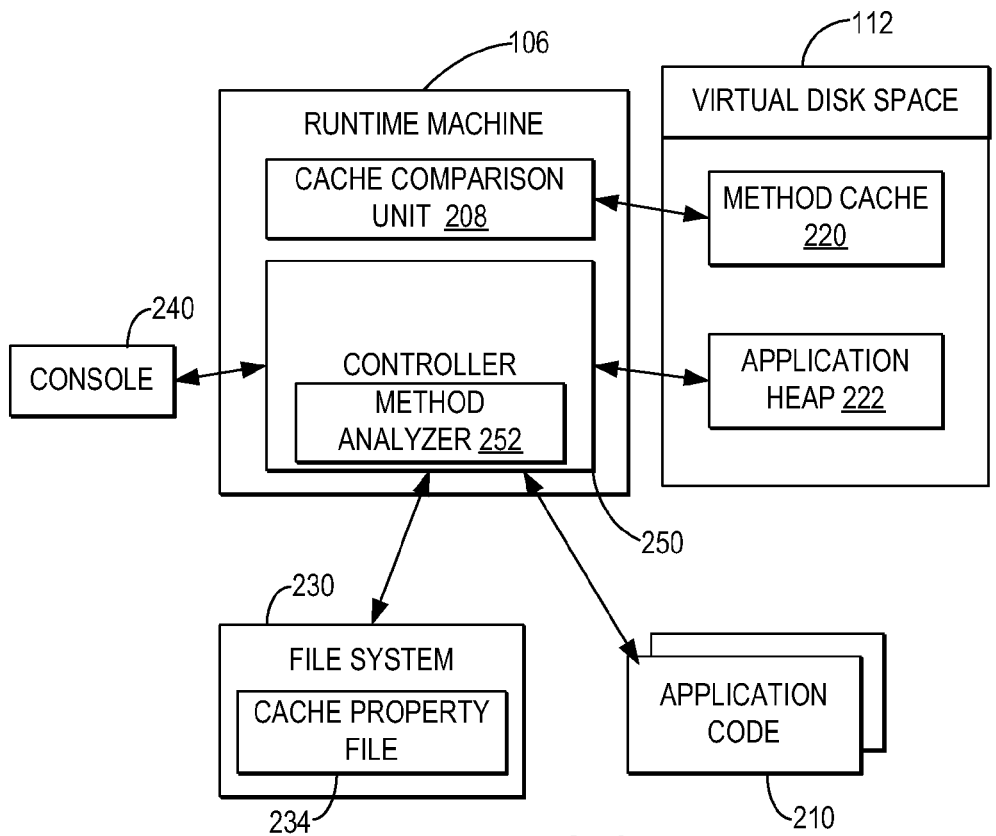
FIG. 2 is a block diagram illustrating one embodiment of a runtime machine for controlling method level caching within the cache managed by the runtime machine.

Referring now to FIG. 2, a block diagram depicts one embodiment of a runtime machine for analyzing application methods to mark methods suitable for method level caching and for controlling method level caching within the cache managed by the runtime machine. It will be understood that in other embodiments, additional or alternate components may be implemented by a runtime machine for controlling method level caching.

Runtime machine 106 includes a controller 250 for controlling the execution of application code 210 of applications 104. In the example, controller 250 may include a virtual machine (VM) controller, where the virtual machine controller compiles the source code of application code 210 into binary instructions, also referred to as bytecode, and executes the bytecode at runtime on operating system 108 or directly on a processor. In another example, application code 210 may represent bytecode already compiled by the virtual machine compiler. Further, in another example, controller 250 may be implemented by an interpreter controller, where application code 210 represents source code for an interpreted language which the interpreter controller translates and executes at runtime on operating system 108 or directly on a processor. It is important to note that runtime machine 106 is described herein as implementing either a virtual machine controller or an interpreter controller, however, in another example, runtime machine may implement both a virtual machine controller and an interpreter controller or may implement multiple instances of one or more virtual machine controllers and interpreter controllers.

In the example, virtual disk space 112 includes an application heap 222 managed by runtime machine 106 from operating system 108 for one or more applications. In addition, in the example, virtual disk space 112 includes a method cache 220 allocated by runtime machine 106 from operating system 108 for caching method results.

According to an advantage, runtime machine 106 supports method level caching by determining when a method is suitable for caching in method cache 220, and, if the method is cache capable, passing the method to cache comparison unit 208. As previously noted with respect to FIG. 1, runtime machine 106 may determine whether a method is suitable for caching at one or more points and from one or more sources in handling application code.

In particular, in one example, in determining whether a method is suitable for caching, an application developer may specify suitability by marking particular methods as cache capable within source code 210. In one example, controller 250 detects methods marked as cache capable within compiled bytecode of application code 210. In another example, as controller 250 executes the source code of application code 210, controller 250 detects those method marked as cache capable.

In the example, within an object-oriented programming language based application, a developer may select to mark specific methods as cache capable within the source code by marking one or more objects or classes of a method, or the method itself, using tags, annotations, or class-level modifiers, for example. In addition, at compile time, controller 250 may also mark methods as cache capable using tags, annotations, or class-level modifiers. For example, with reference now to FIG. 4, code 402 depicts a method specified as cache capable through the class-level modifier of CacheCapable illustrated at reference numeral 404. In addition, with reference to FIG. 4, code 406 depicts a method specified as cache capable through an annotation of "@CacheCapable" as illustrated at reference numeral 408.

In another example, to determine whether a method is suitable for caching, controller 250 includes a method analyzer 252 which analyzes methods to determine if which methods are cache capable and to determine whether it is efficient to cache methods detected as cache capable. In particular, method analyzer 252 analyzes the types of the object graphs for each argument of a method and each result for the method to determine if the method includes all cache capable objects. If the arguments of a method and returned result are all cache capable, then method analyzer 252 marks the method as cache capable and passes the method to cache comparison unit 208. In one example, in determining whether a method is cache capable, method analyzer 252 designates any primitive types of arguments, such as "int" or "string", as cache capable, but designates any non-primitive types of arguments, such as another object's file handle or connection to a file system, such as file system 230, as not cache capable.

In determining whether a method is cache capable, method analyzer 252 may base this determination on whether it would be efficient to select to cache a method in the method cache. In detecting whether it would be efficient to select to cache the method in the method cache, method analyzer 252 may monitor the frequency with which an object graph for a method is generated, a hit to memory ratio for an object graph, and other characteristics of method memory accesses to determine whether to mark a method as cache capable and store the result for the method in method cache 220. For example, during runtime, application heap 222 may include object graphs returned for methods. Method analyzer 252 may compare current object graphs with those in application heap 222, and upon detecting a same object graph in application heap and detecting that the object graph of a method is suitable for caching, mark the method to trigger caching the object graph returned by the method upon a next iteration. In addition, method analyzer 252 may monitor and calculate a hit to memory ratio comparing the number of hits to an object graph with the amount of memory required to store the object graph. If the object graph for a method includes a large matrix, for example, method analyzer 252 would calculate a ratio comparing the number of hits to the matrix with the amount of memory required to store the matrix and compare the ratio with a minimum hit to memory ratio to determine whether it is efficient to cache the method in method cache 220. Further, in deciding whether it is efficient to cache a method, method analyzer 252 may determine that efficiency would be improved by adjusting the maximum cacheable object size within method cache 220 to enable additional cache capable objects. It will be understood that method analyzer 252 may perform other types of analysis of methods and adjust other parameters to attempt to adjust the efficiency of runtime machine 106 on a particular system.

In addition, in another example, in determining whether a method is suitable for caching, a cache property file 234 may include global cache capable settings. In one example, cache property file 234 may specify one or more particular methods as cache capable. In another example, cache property file 234 may specify one or more types of methods, or types of objects or classes, as cache capable. Further, cache property file 234 may specify one or more methods which should be cached with priority over other methods. In addition, it will be understood that cache property file 234 may include additional or alternate types of cache settings, including settings for the size of virtual disk space 112, settings for the size of method cache 220, settings for the maximum method result to be cached in method cache 220, and settings for turning off method level caching. Further, cache property file 234 may also include methods marked as not cache capable, even though the method would be a candidate for caching or may be marked as cache capable within the coding of the application.

At runtime, runtime machine 106 may access cache property file 234 or during compilation runtime machine 106 may access cache property file 234, to detect designated cache capable methods. In the example, cache property file 234 is an XML file stored at a particular address within a particular location within file system 230. In other embodiments, the file type and locations for storing cache property file 234 may vary. In addition, in other embodiments, runtime machine 106 may access cache property file from a storage device other than file system 230 or on the classpath of the application bundled with the source code. Further, in other embodiments, runtime machine 106 may access multiple cache property files from multiple locations within file system 230 or distributed across multiple file systems. Moreover, an application or runtime machine 106 may include a cache property file bundled with the application or runtime machine and installed within file system 230 when the application or runtime machine is installed or run.

Moreover, in determining whether a method is suitable for caching, runtime machine 106 may call method level APIs 116 to prompt a user, via a console 240 to analyze and select the cacheable setting for a method. For example, runtime machine 106 may prompt a user via console 240 with a list of each detected method within application code 210, wherein the user may designate whether each method is cache capable. In another example, runtime machine 106 may prompt a user via console 240 with a list of each detected method marked within the code as cache capable, wherein the user may designate whether a particular cache capable method should be cached during runtime. Further, as method analyzer 252 analyzes methods within application code 210, method analyzer 252 may prompt a user via console 240 to select whether to allow analysis of a method to continue or halt analysis of the method, when the analysis is time or resource intensive beyond a particular threshold of time or resource usage. In addition, runtime machine 106 may provide the user, via console 240 with information indicating current cache allocations to virtual disk space 112, percentage of memory heap 220 in use, and other cache statistics, wherein a user may request adjustment of the allocation amounts.

In one embodiment, cache property file 234 specifies the selection of method level APIs 116 to be called to present a user with method level cache information and selections. In addition, in one embodiment, as a user makes selections via console 240, method level APIs 116 are called which update cache property file 234 with the user selections.

During runtime, when controller 250 detects a method marked as cache capable, controller 250 passes execution control of the method to cache comparison unit 208. As previously noted, controller 250 may detect application code 210 already marked with cache capable methods at compile time or by a developer, method analyzer 252 may analyze application code 210 at runtime and mark cache capable methods, method analyzer 252 may analyze application code 210 at compile time, when implemented within a virtual machine controller, and mark cache capable methods which are detected at runtime, controller 250 may detect a method selected to be cache capable in cache property file 234, or controller 250 may detect a user selection during runtime for a method to be cache capable. In addition, controller 250 may detect that a user selection during runtime via console 240 or a specification in cache property file 234 overrides developer specifications for methods. For example, a method specified as cache capable in application code 210 may be overridden by a setting in cache property file 234 specifying that the method is not cache capable.

Cache comparison unit 208 supports method level caching by searching method cache 220 for previously stored results of a method, storing results of a method, and managing how long method results are cached. In addition, it will be understood that cache comparison unit 208 may perform additional functions in managing virtual disk space 112 and analyzing methods to determine whether a method is cache capable.

In one embodiment, upon receiving execution control of a cache capable method, cache comparison unit 208 implements a hash function to return a hashvalue, using the object graphs of the arguments or results of the cache capable method as inputs. Next, cache comparison unit 208 searches method cache 220 using the determined hashvalue as an index. It will be understood that additional or alternate types of functions may be implemented to calculate an index into the cache to determine whether there is a cache hit or cache miss for a method.

If cache comparison unit 208 detects a cache miss for the hashvalue in method cache 220, then cache comparison unit executes the method and caches the result in method cache 220. Otherwise, if cache comparison unit detects a cache hit for the hashvalue in method cache 220, cache comparison unit 208 inspects the timestamp for the cache entry in method cache 220 to determine if the cache entry is stale because the amount of time passed since the timestamp exceeds a timeout setting for the method. If the cache entry is stale, cache comparison unit executes the method and caches the result in method cache 220. If the cache entry is not stale, then cache comparison unit 208 uses the cached result from method cache 220.

Figures 3, 4, 5:
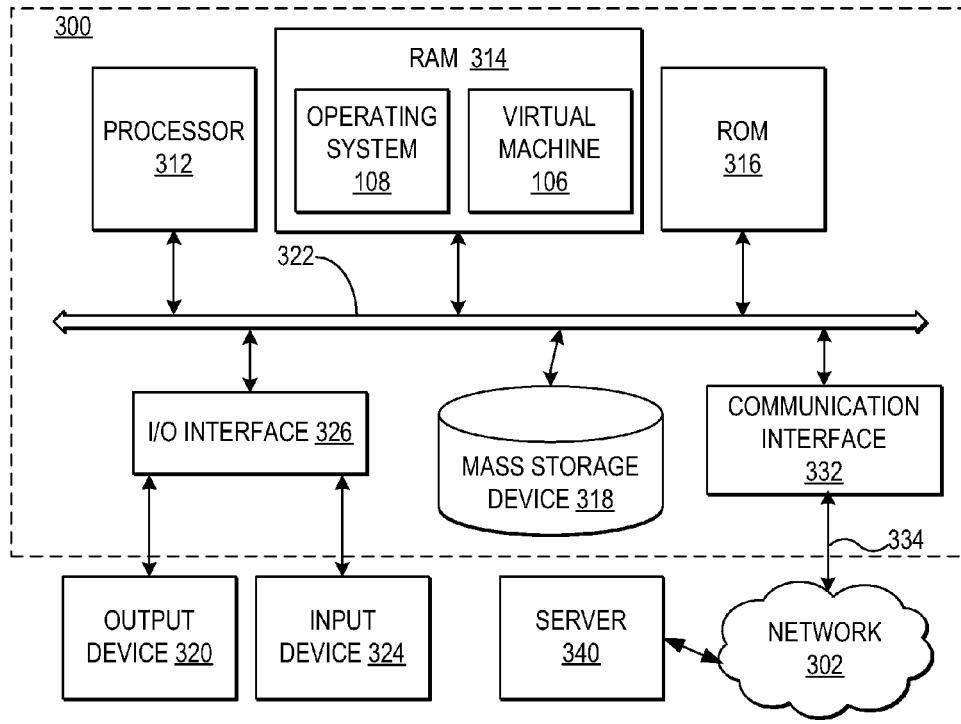
FIG. 3 is a block diagram depicting a computer system in which the present invention may be implemented.
FIG. 4 is an illustrative diagram of examples of methods within application code marked as cache capable.
FIG. 5 is an illustrative diagram of examples of methods within application code marked with a timeout setting for a length of time a cached result of the method is valid.

In determining whether a method entry is stale, the timeout setting for the method may be specified in the method code using an annotation or keyword, for example. For example, with reference now to FIG. 5, code 502 depicts an object with an annotation illustrated at reference numeral 504 specifying a method level cache timeout of "@CacheTimeout="100"" and "@CacheRes="min"" to specify a timeout of 100 minutes. In code 506, additional keywords illustrated at reference numeral 508 "CT(100)" and "CR(M)" specify a method level cache timeout of 100 minutes. It is important to note that while the examples of timeout settings in FIG. 5 illustrate timeout settings in minutes, other increments of time may be set.

A developer may specify the timeout settings for methods when coding the application. In addition, if method analyzer 252 modifies a method entry as cache capable, method analyzer 252 may access cache property file 234 to determine what timeout periods to associate with message entries globally or by object types. Further, cache property file 234 may include global or object level timeout periods which override any timeout periods coded by the developer in the application.

In addition, as to setting the timeout setting for a method, a user may select, via console 240, a timeout setting for a particular method, a selection of methods, and a type of method. In addition, cache property file 234 may specify that a user should be prompted, via console 240, to select whether to extend a timeout setting which has expired, for a particular method or type of method.

For a cacheable method, additional control settings may be specified for a particular method or in cache property file 234 based on the operating conditions of the system, such as the processor load, the cache load, the frequency of garbage collection, or other settings. For example, cache property file 234 may specify that if runtime machine 106 is performing garbage collection or other cache management at a frequency which exceeds a particular threshold, then the timeout settings for a particular method or type of method should be adjusted.

With reference now to FIG. 3, a block diagram illustrates a computer system in which the present invention may be implemented. The controllers and systems of the present invention may be executed in a variety of systems, including a variety of computing systems, such as computer system 300, communicatively connected to a network, such as network 302.

Computer system 300 includes a bus 322 or other communication device for communicating information within computer system 300, and at least one processing device such as processor 312, coupled to bus 322 for processing information. Bus 322 preferably includes low-latency and higher latency paths that are connected by bridges and adapters and controlled within computer system 300 by multiple bus controllers. When implemented as a server, computer system 300 may include multiple processors designed to improve network-servicing power. Where multiple processors share bus 322, an additional controller (not depicted) for managing bus access and locks may be implemented.

Processor 312 may be a general-purpose processor such as IBM's PowerPC™ processor that, during normal operation, processes data under the control of an one or more layers described in stack 100, including but not limited to, operating system 108 and runtime machine 106, and other code accessible from a dynamic storage device such as random access memory (RAM) 314, a static storage device such as Read Only Memory (ROM) 316, a data storage device, such as mass storage device 318, or other data storage medium.

In one embodiment, the operations performed by processor 312 may control runtime machine support for method level caching, as depicted in the operations of flowcharts of FIGS. 9, 10, 11, and 12 and in other operations described herein. Operations performed by processor 312 may be requested by operating system 108 or runtime machine 106 or other code or the steps of the present invention might be performed by specific hardware components that contain hardwired logic for performing the steps, or by any combination of programmed computer components and custom hardware components.

The runtime machine for supporting method level caching of the present invention may be provided as a computer program product, included on a computer-readable or machine-readable medium having stored thereon the computer-readable program that when executed on computer system 300 causes computer system 300 to perform a process according to the present invention. The terms "computer-readable medium" or "machine-readable medium" as used herein includes any medium that participates in providing instructions to processor 312 or other components of computer system 300 for execution. Such a medium may take many forms including, but not limited to, storage type media, such as non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 300 can read and which is suitable for storing instructions. In the present embodiment, an example of a non-volatile medium is mass storage device 318, which as depicted is an internal component of computer system 300, but will be understood to also be provided by an external device. Volatile media include dynamic memory such as RAM 314.

Moreover, the function management tool of the present invention may be downloaded or distributed as a computer program product, wherein the program instructions may be transmitted from a remote computer such as a server 340 to requesting computer system 300 by way of data signals embodied in a carrier wave or other propagation medium via network 302 to a network link 334 (e.g. a modem or network connection) to a communications interface 332 coupled to bus 322. In one example, where processor 312 includes multiple processor elements is, a processing task distributed among the processor elements, whether locally or via a network, may represent a consumer program product, where the processing task includes program instructions for performing a process or program instructions for accessing Java (Java is a registered trademark of Sun Microsystems, Inc.) objects or other executables for performing a process. Communications interface 332 provides a two-way data communications coupling to network link 334 that may be connected, for example, to a local area network (LAN), wide area network (WAN), or directly to an Internet Service Provider (ISP). In particular, network link 334 may provide wired and/or wireless network communications to one or more networks, such as network 302. Further, although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

Network link 334 and network 203 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. For example, input device 324 may include, for example, a microphone, a video capture device, a card reader, a body scanning system, a keyboard, a mouse, or other input peripheral device, communicatively enabled on bus 322 via I/O interface 326 controlling inputs. In addition, for example, an output device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention.

Figure 6:
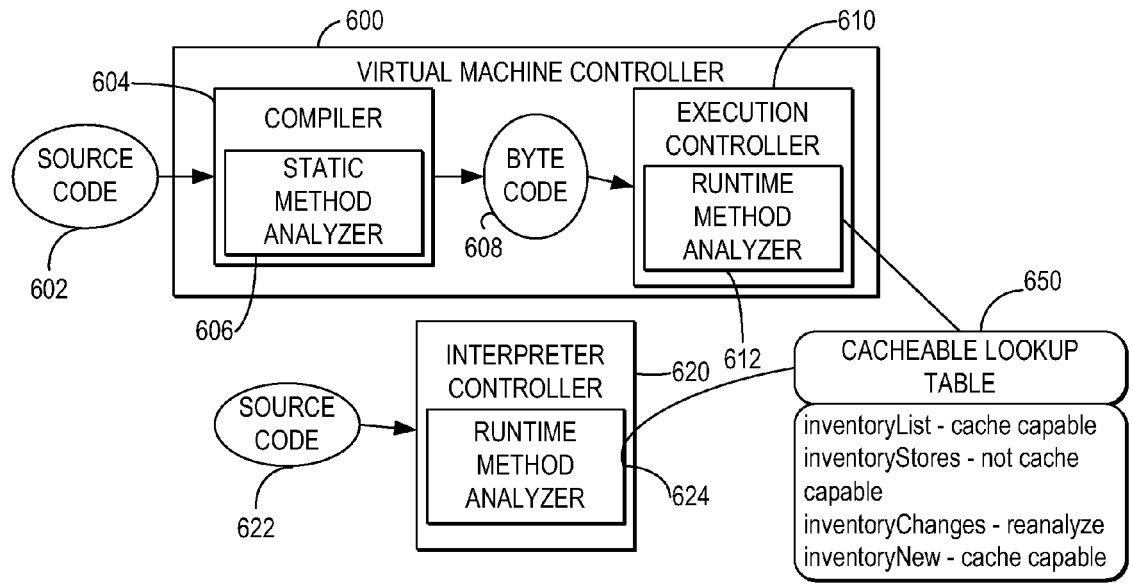
FIG. 6 is a block diagram illustrating examples of a method for analyzing methods implemented within a virtual machine controller and an interpreter controller.

Referring now to FIG. 6, a block diagram depicts examples of a method for analyzing methods implemented within a virtual machine controller and an interpreter controller. As previously described, runtime machine 106 may be implemented through one or more of a virtual machine or an interpreter, including a controller 250. Controller 250 includes a method analyzer 252 for analyzing methods and deciding whether to mark a method as cache capable. In the example illustrated in FIG. 6, controller 250 may include one or more of a virtual machine controller 600 and interpreter controller 620.

Virtual machine controller 600 includes a compiler 604 which compiles source code 602 into bytecode 608 which, at runtime, is executed by execution controller 610. Interpreter controller 620 interprets and executes source code 622 at runtime.

Since virtual machine controller 600 compiles source code 602 prior to execution, compiler 604 may implement an embodiment of method analyzer 252 which functions at compile time, as represented by static method analyzer 606. In addition, execution controller 610 of virtual machine controller 600 may implement an embodiment of method analyzer 252 which functions at runtime, as represented by runtime method analyzer 612. Similarly, interpreter controller 620 may implement an embodiment of method analyzer 252 which functions at runtime, as represented by runtime method analyzer 624. It is important to note that while the example illustrates both compiler 604 and execution controller 610 with an instance of a method analyzer, in another example, only one of compiler 604 and execution controller 610 may implement an instance of a method analyzer.

Runtime method analyzer 612 and runtime method analyzer 624, in one example, detect methods suitable for caching in the method cache and update these methods within a cacheable lookup table, such as cacheable lookup table 650. As illustrated, each method within cacheable lookup table 650 may include a marking of whether a determination of cache capable or not cache capable. In addition, each method within cacheable lookup table 650 may include a marking whether a method is not cache capable and additional data about why the method is not cache capable or when the method needs to be reanalyzed. Although not depicted, cacheable lookup table 650 may also include the cache timeout settings for each method. It is important to note that cacheable lookup table 650 may be accessed by only one method analyzer instance during runtime or cache lookup table 650 may be shared among multiple method analyzer instances or runtime machine instances.

A user may trigger static method analyzer 606, runtime method analyzer 612 or runtime method analyzer 624 using a command line within source code 602, via console 240, or through other available interfaces. A user may trigger a method analyzer instance to analyze a particular method, portion of source code or all source code. For example, to trigger execution controller 610 to run runtime method analyzer 612, source code 602 may include a command-line of java—Dcache.method="true" compiled into bytecode 608 which triggers runtime method analyzer 612 to analyze the methods within bytecode 608 to decide whether any of the methods are cache capable and mark cache capable methods.

In addition, a user, via console 240 may request static method analyzer 606 to analyze source code 602, runtime method analyzer 612 to analyze bytecode 608 or runtime method analyzer 624 to analyze source code 622. Furthermore, it will be understood that additional types of inputs may trigger analysis by static method analyzer 606, runtime method analyzer 612 or runtime method analyzer 624.

As will be further described with reference to FIG. 7, it is important to note that static method analyzer 606 may perform additional or alternate analysis of source code 602 and may mark methods as cache capable in an additional or alternate manner from runtime method analyzers 612 and 624 since static method analyzer 606 performs analysis of methods at compile time, while runtime method analyzers 612 and 624 perform analysis of live method object graphs at runtime.

Figure 7:
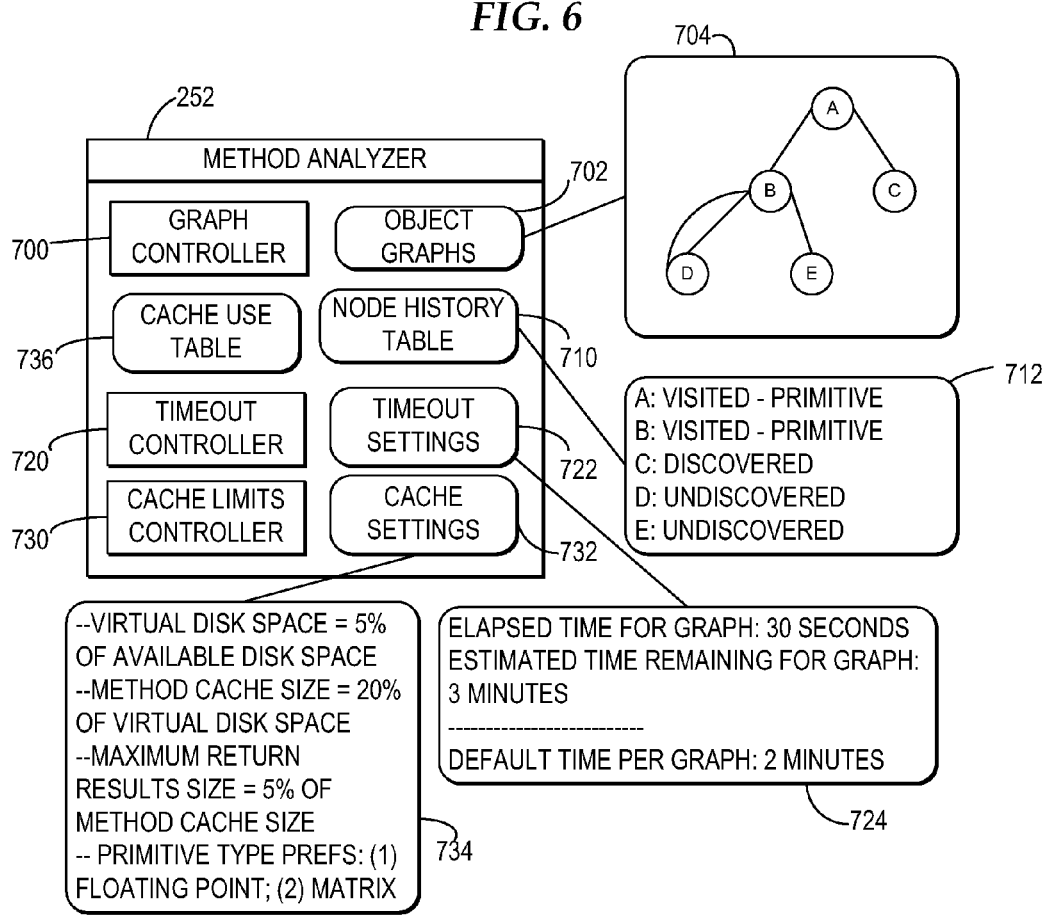
FIG. 7 is a block diagram depicting an example of a method analyzer instance for analyzing application code, deciding which methods are cache capable, and marking methods as cache capable at compile time or runtime.

With reference now to FIG. 7, a block diagram illustrates an example of a method analyzer instance for analyzing application code, deciding which methods are cache capable, and marking methods as cache capable at compile time or runtime.

In the example, method analyzer 252 includes an object graph controller 700. Graph controller 700 recursively inspects the argument object types and return object types of a method by analyzing object graphs 702 available for each argument and result of a method. In particular, to recursively inspect a method, the object graphs for the method is accessed. In the example of method analyzer 252 implemented as static method analyzer 606, accessing an object graph for a method requires graph controller 700 to first construct the object graphs for each argument object and the result object of a method. In the example of a method analyzer 252 implemented as one of runtime method analyzers 612 and 624, graph controller 700 accesses live object graphs for methods at runtime.

In particular, graph controller 700 recursively inspects the types of argument objects and the result object of a method by traversing the object graphs for the arguments and result, starting at the initial object as the root and searching through the nodes of the object graph which each represent an argument object or result object. In one example, each of object graphs 702 is structured with a root node representing an object from which all other objects, represented by other nodes, can be reached. In addition, in one example, each of object graphs 702 may include paths between nodes which terminate and which circularly reference another node. In one example of a data structure of an object graph illustrated at reference numeral 704, the root node is represented by node "A" and additional nodes "B", "C", "D", and "E" represent objects reachable from node "A". In the example, a path from node "D" circularly references node "B". In another example, an object graph may include additional or alternate circular reference paths or no circular reference paths.

In analyzing object graphs 702, graph controller 700 traverses each object graph starting at the node for the initial object of a method as the root and searching for primitive types and cycles. For example, graph controller 700 would start with the initial argument or result object of a method represented by the node marked "A" in the graphical illustration of the nodes of an object graph represented at reference numeral 704.

While traversing an object graph, primitive types and cycles represent leaf nodes indicating successfully terminated paths for the object graph. In addition, while traversing the graph, where graph controller 700 identifies a non-primitive type of argument, the class path is searched for all implementations of that type and subtype and all identified implementations of the non-primitive type of argument are added to the object graph to be recursively searched. Examples of objects which cannot be resolved by graph controller 700 as primitive types, and therefore are identified as non-primitive types of arguments, include, but are not limited to, file access streams, keyboard input/output (I/O) objects, screen I/O objects, objects that access other processes, and objects that access system memory.

As graph controller 700 visits nodes of an object graph, graph controller 700 records the traverse history and determination of whether a node includes a primitive or non-primitive type in a node history table 710, an example of which is illustrated at reference numeral 712. In one example, graph controller 700 implements a breath-first search of the nodes of an object graph, such as the type graph illustrated at reference numeral 704. As reflected in the example of node history table illustrated at reference numeral 712, for a breath-first search, graph controller 700 would visit node "A" as a root, then visit each of the first level of nodes, such as nodes "B" and "C", and then would return to search for each of the second level of nodes, such as nodes "D" and "E". It will be understood that in additional or alternate examples graph controller 700 may implement other types of graph searching methods.

When graph controller 700 determines that a method is cache capable or not cache capable, if at compile time, static method analyzer 606 marks the method as cache capable or not cache capable within bytecode 608. At runtime, runtime method analyzer 612 reads bytecode 608 and updates cacheable lookup table 650 with those methods marked as cache capable and those methods marked as not cache capable. In addition or alternatively, runtime method analyzer 612 or runtime method analyzer 624, at runtime may analyze bytecode 608 or source code 622, determine that a method is cache capable or not cache capable, and update cacheable lookup table 650 with the result of the analysis. By performing analysis of methods at compile time, the only runtime overhead for setting cache capable methods is updating cacheable lookup table 650. In contrast, performing analysis of methods at runtime requires traversal of object graphs for detecting object types at the expense of executing the application, but runtime analysis over time may yield more efficient method caching selections.

In addition, it is important to note that as graph controller 700 traverses object graphs 702, graph controller 700 may automatically stop traversal or be triggered to stop traversal if particular conditions are detected. For example, while traversing an object graph, if graph controller 700 detects an object larger than the maximum cacheable size, graph controller 700 may automatically stop traversal of the object graph for the method and mark the method as not cache capable. In another example, while traversing object graphs 702, if graph controller 700 detects a traversal of an object graph is taking too long or is estimated to take longer than a set time limit, graph controller 700 will automatically stop traversal of the object graph for the method and mark the method as not cache capable. In yet another example, if graph controller 700 detects an object is a primitive type but it is on a list of types of primitive objects which are set as less preferable to be cached in the method cache, graph controller 700 may automatically stop traversal of the object graph for the method and mark the method as not cache capable. In a further example, if graph controller 700 stops traversal of an object graph for a reason other than detecting a non-primitive object type, graph controller 700 may mark the method to be reanalyzed in cacheable lookup table 650 or other data table. It will be understood that additional or alternate conditions may cause graph controller 700 to automatically stop traversal of an object graph and mark the method associated with the object graph as not cache capable.

With reference to graph controller 700 stopping traversal responsive to traversal taking too long, in one example, a timeout controller 720 tracks the amount of time spent by graph controller 700 in analyzing each object graph in timeout settings 722. As illustrated in an example of timeout settings 722 at reference numeral 724, timeout settings 722 may include an elapsed time of analysis of an object graph, such as 30 seconds in the example. In addition, as timeout controller 720 monitors analysis and detects remaining paths within an object graph, timeout controller 720 may estimate a time remaining to analyze an entire object graph for a method, such as 3 minutes in the example. Further, timeout settings 724 may include a default maximum analysis time per object graph, such as 2 minutes in the example. When timeout controller 720 detects the elapsed time for traversing an object graph or the estimated time remaining for traversing an object graph exceed the default time for the traversing object graphs, timeout controller 720 may prompt a user to select whether to allow analysis to continue or timeout controller 720 may direct graph controller 700 to abort analysis of the object graph, mark the method associated with the graph as not cache capable, and move to a next method object graph.

In one example, the maximum time per graph settings within timeout settings 722 may be specified by a developer through command line switches within the application code. In addition, cache property file 234 or a user via console 240 may specify limits for timeout settings 722. Moreover, timeout controller 720 may monitor the average time per object graph traversal and other time related characteristics for analysis performed by graph controller 700 and adjust or select the limits in time settings 722 to improve the efficiency of runtime machine 106.

In particular, it is important to note that the analysis of types within object graphs by graph controller 700 may be a computationally intensive analysis. The amount of time suitable for use of computational cycles to analyze types within object graphs at compile time may be different from the time suitable at runtime. Further, to improve efficiency in analyzing types within object graphs, graph controller 700 may access additional memory or processor power to perform the analysis. In particular, the analysis performed by graph controller 700 may be performed by a cell processor or other processor with multiple functional units which can be programmed to efficiently perform computationally intensive analysis of tables, matrices, and other types of objects which typically require a significant amount of memory and computational cycles to generate or calculate.

With reference to graph controller 700 stopping traversal responsive to detecting object graphs that are too large or detecting a primitive object of a type that is not preferred, graph controller 700 detects limits on method caching and primitive type preferences from cache settings 732. In an example of cache settings 732 illustrated at reference numeral 734, limits are set on the size of the virtual disk space, method cache size, maximum result object size, and preference of primitive type floating point objects over primitive type matrix objects.

In one example, a cache limits controller 730 of method analyzer 252 may monitor object graph sizes and may monitor primitive object types to determine whether a method should be automatically passed and marked as not cache capable by graph controller 700 based on the limits set in cache settings 732. In addition, cache limits controller 730 may monitor cache use, calculate cache settings which would provide more efficient use of the available memory and processing resources, and adjust cache settings 732 to the calculated settings, including, but not limited to, limitations on cache size, object size, and other cache characteristics. As previously described, a user may also specify limits in cache settings 732 via console 240 or through cache property file 234. In addition, a developer may add command switch lines to application code which specifies limits for cache settings 732.

For cache limits controller 730 to track and analyze cache use and adjust cache settings, cache limits controller 730 may track cache hits and misses of result object graphs and the sizes of the result object graphs in a cache use table 736. In addition, cache limits controller 730 may track other types of cache usage in cache use table 736. Then, periodically, or when cache use reaches a minimum limit, cache limits controller 730 may analyze the data stored in cache use table 736 and determine whether runtime machine 106 would run more efficiently if more space were allocated to the virtual disk space or method cache or if larger result objects were allowed to be cached in the method cache. If cache limits controller 730 determines that runtime machine 106 would run more efficiently with different settings within cache settings 732, cache limits controller 730 may adjust one or more of the settings within cache settings 732. For example, during compile time, if cache limits controller 730 detects a same result object graph recorded multiple times in cache use table 736 and the result object graph is suitable for caching, but the size of the result object graph is larger than the maximum object size, cache limits controller 730 may adjust the maximum object size to allow for caching the result object. Alternatively, cache limits controller 730 may apply an override to the maximum object size for a particular result object of a method. Further, cache limits controller 730 may make recommendations, via console 240 for a user to select from to adjust cache settings 732 to provide for more efficient operation.

Figure 8:
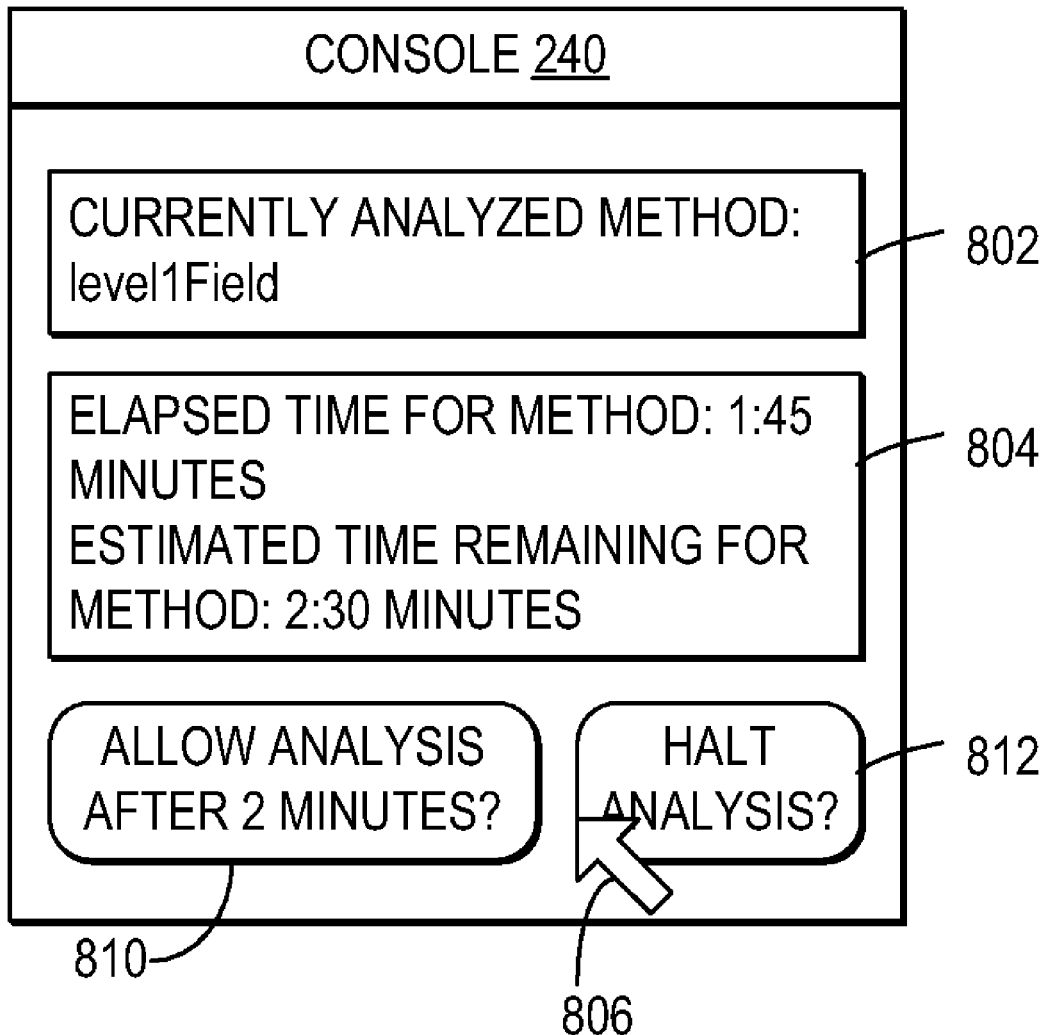
FIG. 8 is a block diagram illustrating one example of a user console through which a user may select to halt or allow analysis of a method by a method analyzer to continue.

With reference now to FIG. 8, a block diagram illustrates one example of a user console through which a user may select to halt or allow analysis of a method by a method analyzer to continue. In the example, an implementation of console 240 includes a display interface through which a user is enabled to view the name of the method currently being analyzed, as illustrated at reference numeral 802, and the elapsed time for analyzing the method and the estimated time remaining for analyzing the method, as depicted at reference numeral 804. In one example, timeout controller 720 tracks the elapsed time and predicts the estimated time for analyzing the method as illustrated.

A user accessing console 240 may select whether to direct timeout controller 720 to allow the method type analysis to continue after a maximum timeout setting of 2 minutes by selecting a button 810 using cursor 806. In addition, a user accessing console 240 may select whether to direct graph controller 700 to halt the method type analysis of the method immediately by selecting a button 812 using cursor 806. It will be understood that positioning cursor 806 in combination with an input to select a button is one of multiple types of inputs that may be accessible to a user to choose from options within console 240.

Although not depicted within the illustration, a user may select to adjust other settings and limits applied by method analyzer 252 such as cache settings 732. In addition, method analyzer 252 may enable a user via console 240 to select to mark a method as cache capable or not cache capable in cacheable lookup table 650.

By enabling a user to select, via console 240 to participate in controlling the analysis of method types by method analyzer 252, the user may apply particular policies or limits at a particular system to achieve particular goals for the application running on the particular system. For example, a developer may design a three-dimensional (3D) multi-player video game engine application to run on runtime machine 106. In a demonstration of the speed of the 3D engine application against the speed of other 3D engine applications, a vendor requires competing application developers to run their application on the same set of hardware and on the same runtime machine which supports method level caching without any middleware. If the hardware provided for the competition has different CPU or memory power from which a developer expected, the developer, through console 240 may select to adjust the limits for method type analysis at compile or runtime by method analyzer 252 via console 240 in an attempt to implement the application most efficiently with the different CPU and memory power from what was expected.

Figure 9:
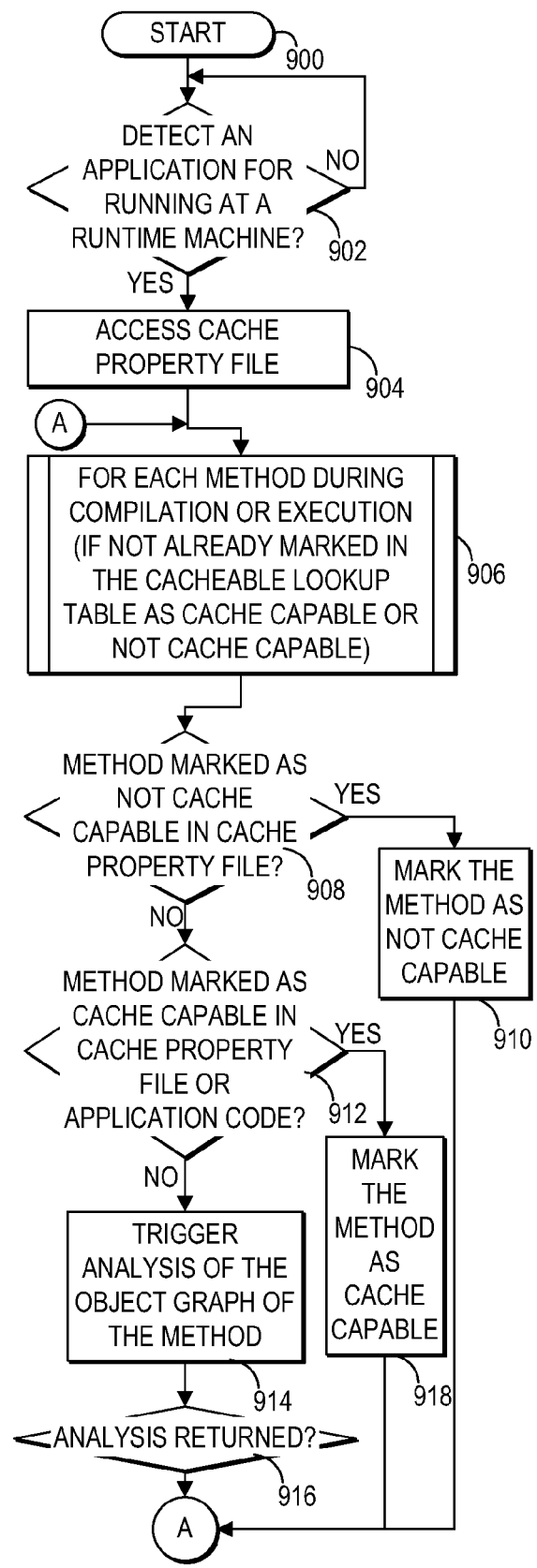
FIG. 9 is a high level logic flowchart depicting a process and program for a runtime machine running application code which includes cache capable methods.

With reference now to FIG. 9, a high level logic flowchart depicts a process and program for a runtime machine running application code which includes cache capable methods. In the example, the process starts at block 900 and thereafter proceeds to block 902. Block 902 depicts a determination whether a runtime machine detects an application to run. When the runtime machine detects an application, then the process passes to block 904. As previously described, the application may include application code such as source code or compiled bytecode.

Block 904 illustrates accessing a cache property file specifying properties of the runtime machine cache and method level caching specifications. Next, block 906 depicts the process performed for each method, during compilation or execution. If the process is performed at execution of the method, then those methods which are not already marked as cache capable or specifically not cache capable are analyzed. Thereafter, block 908 illustrates a determination whether the method is marked as not cache capable in the cache property file. If the method is marked as not cache capable in the cache property file, then the process passes to block 910. Block 910 illustrates marking the method as not cache capable, and the process returns to block 906. It is important to note that marking a method as cache capable at compile time may include marking methods within the compiled bytecode, but marking a method as cache capable at runtime may include marking methods within the cacheable lookup table or other data structure managing the cache capability of methods.

Returning to block 908, if the method is not marked as not cache capable in the cache property file, the process passes to block 912. Block 912 depicts a determination whether the method is specifically marked as cache capable in the cache property file or in the application code. If the method is specifically marked as not cache capable in the cache property file or application code, then the process passes to block 918. Block 918 depicts marking the method as cache capable, and the process returns to block 906.

Returning to block 912, if the method is not specifically marked as cache capable, then the process passes to block 914. Block 914 depicts triggering analysis of the object graph of the method, which in one example triggers the processes described in FIG. 10 and FIG. 11. Next, block 916 illustrates a determination whether an analysis of the method is returned. When analysis is returned with a determination that a method is either cache capable or not cache capable, then the process passes to block 906.

Figure 10:
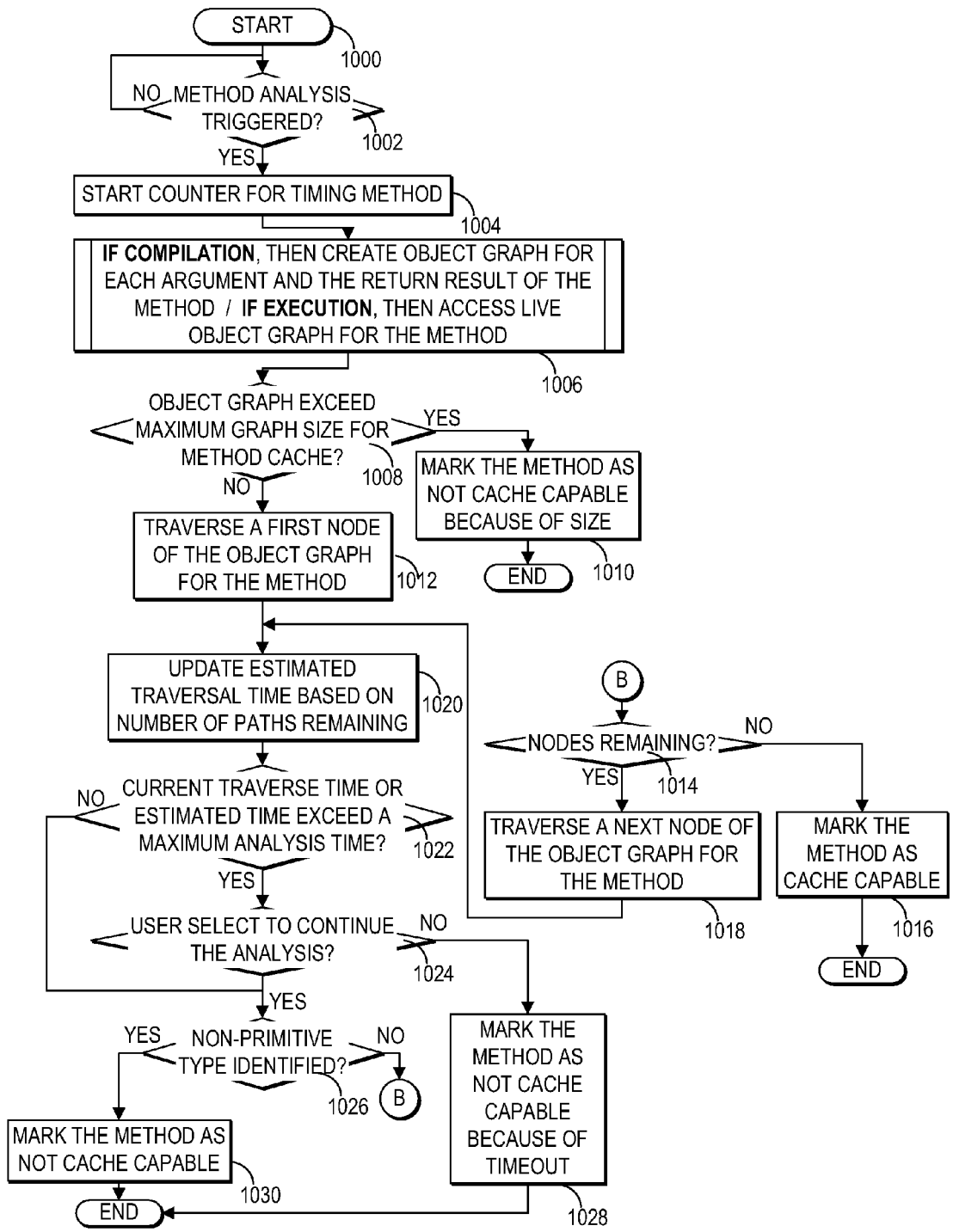
FIG. 10 is a high level logic flowchart illustrating a process and program for analyzing a method to determine whether the method is suitable for method level caching.

Referring now to FIG. 10, a high level logic flowchart depicts a process and program for analyzing a method to determine whether the method is suitable for method level caching. In the example, the process starts at block 1000 and thereafter proceeds to block 1002. Block 1002 illustrates a determination whether the method analysis is triggered. In one example, method analysis is performed by one or more of the components of method analyzer 252. When method analysis is triggered, the process passes from block 1002 to block 1004.

Block 1004 illustrates starting a counter for timing the analysis time for the method. Next, block 1006 depicts that if the process is part of compilation of source code into bytecode, then the method analyzer creates one or more object graphs for each argument and result of a method. At block 1006 if the process is part of execution of compiled bytecode or interpreted source code, then the method analyzer accesses live object graphs for the method.

Next, block 1008 depicts a determination whether the object graph exceeds a maximum graph size for the method cache. If the object graph exceeds a maximum graph size for the method cache, then the process passes to block 1010. Block 1010 illustrates marking the method as not cache capable because of size, and the process returns. It is important to note that a method may be marked as not cache capable alone or may be marked as not cache capable with an indicator of the reason the method is not suitable for caching. In the example of a method which is marked as not cache capable because of size, if the method analyzer or user later adjusts the maximum graph size, then the method may be reanalyzed for suitability for caching.

Returning to block 1008, if the object graph does not exceed the maximum graph size, then the process passes to block 1012. Block 1012 illustrates traversing a first node of the object graph for the method. Although not depicted, the method analyzer may implement one or many types of graph analysis tools, such as a breath-first analysis of the nodes of the object graph. During the analysis, the method analyzer may track whether each node has been visited and whether the node represents a primitive type or non-primitive type object. Next, block 1020 depicts updating the estimated traversal time for the method based on the number of paths remaining. Thereafter, block 1022 illustrates a determination whether the current traverse time for the method or the estimated traversal time for the method exceed one or more maximum analysis times set for the method or for all methods. If the maximum analysis time is not exceeded, then the process passes to block 1026. If the maximum analysis time is exceeded, then the process passes to block 1024. Block 1024 illustrates a determination whether the user selects to continue analysis. If the user selects to continue analysis, then the process passes to block 1026. If the user does not select to continue analysis, then the process passes to block 1028. Block 1028 depicts marking the method as not cache capable because of a timeout, and the process returns the result.

Referring now to block 1026, a determination is made whether the method analyzer identifies a non-primitive type for the current node. If the method analyzer identifies a non-primitive type, then the process passes to block 1030. Block 1030 depicts marking the method as not cache capable, and the process ends. In addition, although not depicted, the method analyzer may perform additional analysis of the method when a non-primitive type is detected. Otherwise, at block 1026, if the method analyzer does not detect a non-primitive type for the current node, then the process passes to block 1014.

Block 1014 illustrates a determination whether there are any nodes remaining for the object graph. If there are no nodes remaining, then the process passes to block 1016. Block 1016 illustrates marking the method as cache capable and the process returns. Otherwise, at block 1014, if there are nodes remaining, then the process passes to block 1018. Block 1018 depicts traversing a next node of the object graph for a method, and the process passes to block 1020.

Figure 11:
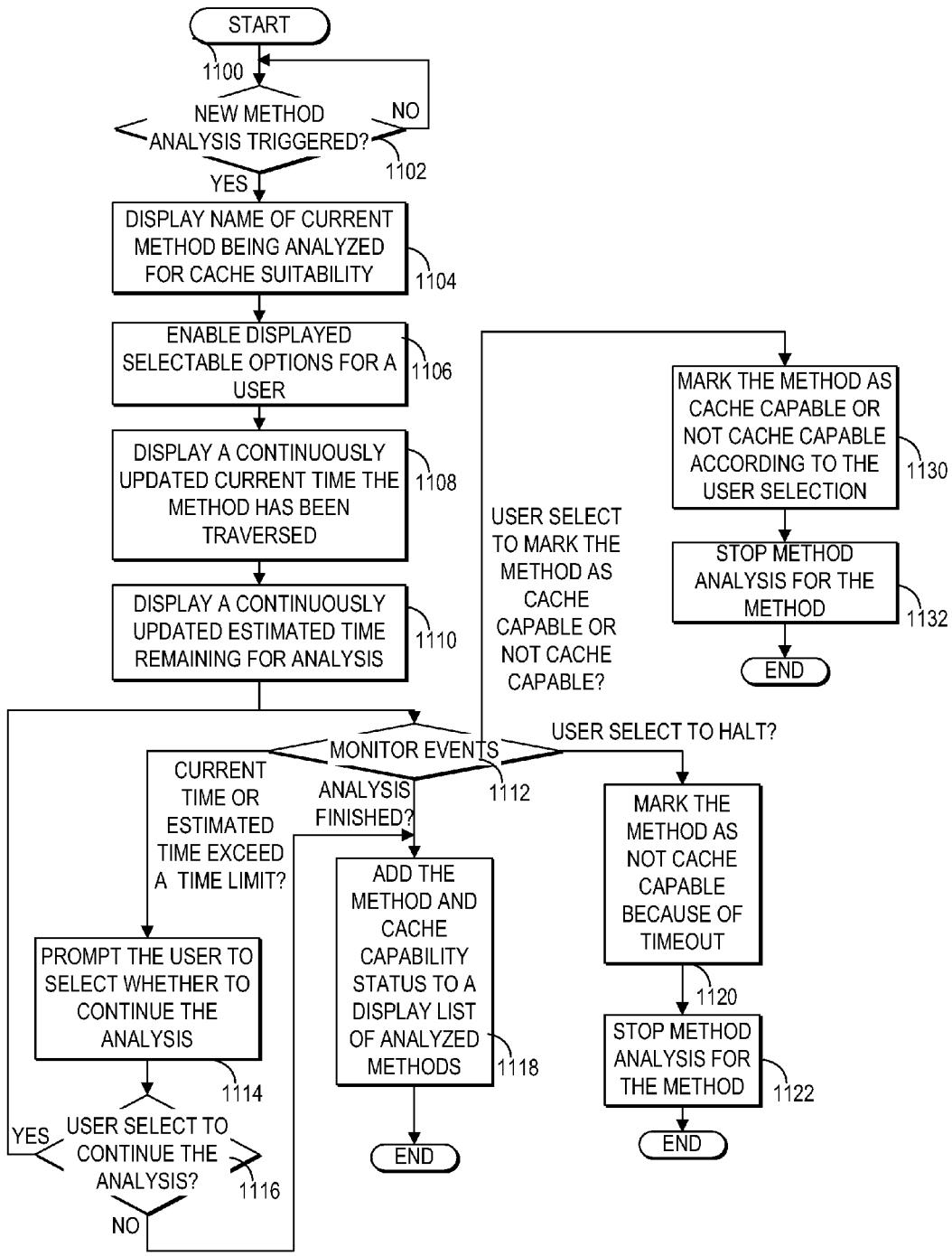
FIG. 11 is a high level logic flowchart depicting a process and program for a method analyzer managing a user interface within a console through which a user may monitor individual method analysis and select to adjust the parameters of method analysis.

With reference now to FIG. 11, a high level logic flowchart depicts a process and program for a method analyzer managing a user interface within a console through which a user may monitor individual method analysis and select to adjust the parameters of method analysis. In the example, the process starts at block 1100 and thereafter proceeds to block 1102. Block 1102 illustrates a determination whether the method analyzer is triggered to analyze a method, for example, as described with reference to block 914 of FIG. 9. If the method analyzer is triggered to analyze a method, then the process passes to block 1104.

Block 1104 illustrates displaying a name of the current method being analyzed for cache suitability. Next, block 1106 depicts enabling displayed selectable options, such as options for a user to halt analysis, to continue analysis or to mark a method as not cache capable or cache capable. Thereafter, block 1108 illustrates displaying a continuously updated current time the method has been traversed. Next, block 1110 depicts displaying a continuously updated estimated time remaining for analysis, and the process passes to block 1112.

Block 1112 depicts the method analyzer monitoring for events, including user selections. At block 1112 if the method analyzer detects a user selection to halt analysis of a method, then the process passes to block 1120. Block 1120 illustrates marking the method as not cache capable because of timeout. Next block 1122 depicts stopping method analysis for the method, including stopping the displayed timers for the method, and the process ends.

Returning to block 1112, if the method analyzer detects a user selection to specifically mark a method as cache capable or not cache capable, then the process passes to block 1130. Block 1130 depicts marking the method as cache capable or not cache capable according to the user selection. Next, block 1132 illustrates stopping method analysis for the method, including stopping the displayed timers for the method, and the process ends.

Returning to block 1112, if the method analyzer detects the method analysis is finished, then the process passes to block 1118. Block 1118 depicts adding the method and cache capability status to the display list of analyzed methods, and the process ends. In another example, at block 1112, if the method analyzer detects the current time or estimated time for analysis of the method exceeds one or more maximum time limits, then the process passes to block 1114. Block 1114 illustrates adjusting the display to prompt the user to select whether to continue the analysis. Next, block 1116 depicts a determination whether the user selects to continue the analysis. If the user selects to continue the analysis, then the process continues to monitor events. If the user does not select to continue the analysis, then the process passes to block 1118.

Figure 12:
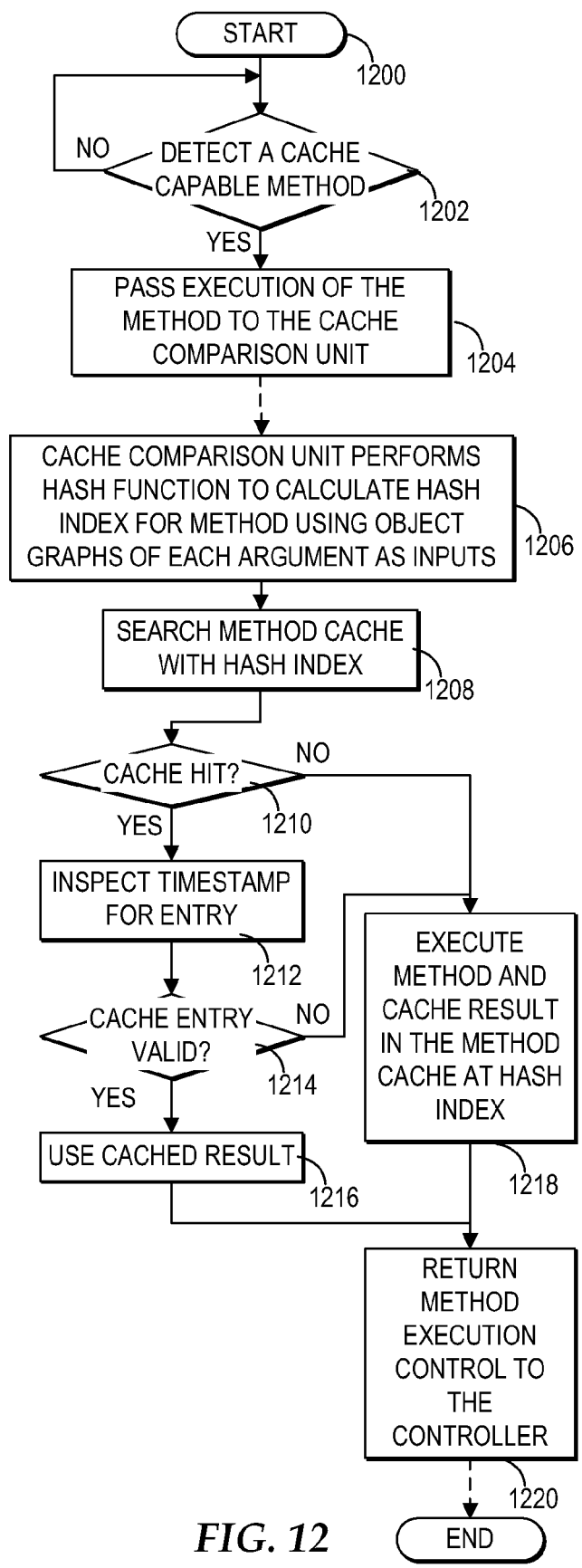
FIG. 12 is a high level logic flowchart depicting a process and program for a runtime machine managing execution of a cache capable method

Referring now to FIG. 12, a high level logic flowchart illustrates a process and program for a runtime machine managing execution of a cache capable method. In the example, the process starts at block 1200 and thereafter proceeds to block 1202. Block 1202 depicts a determination whether the runtime machine controller detects a cache capable method. When the controller detects a cache capable method, then the process passes to block 1204. Block 1204 illustrates passing execution of the method to the cache comparison unit, and the process passes to block 1206.

Block 1206 depicts the cache comparison unit performing a hash function to calculate a hash index for the method using the object graph of each argument of the method as inputs. Next, block 1208 illustrates searching the method cache with the hash index. Thereafter, block 1210 illustrates a determination whether there is a cache hit for the hash index in the method cache. If there is not a cache hit, then the process passes to block 1218. Block 1218 depicts executing the method and caching the result in the method cache at the hash index. Next, block 1220 illustrates returning execution control of the method to the controller, and the process ends.

Otherwise, returning to block 1210 if there is a cache hit, then the process passes to block 1212. Block 1212 illustrates inspecting the timestamp for the entry. In one example, the method cache may include a timestamp stored with the method result entry. In another example, the cache comparison unit may access the cache property file for a timestamp or prompt the user to select a timestamp. Next, block 1214 depicts a determination whether the cache entry for the method is valid because based on the timestamp the data has not become stale. If the cached entry is not valid, then the process passes to block 1218. If the cached entry is valid, then the process passes to block 1216. Block 1216 illustrates using the cached result for the method, and the process passes to block 1220.

While the invention has been particularly shown and described with reference to a preferred embodiment, it will be understood by those skilled in the art that various changes in form and detail may be made therein without departing from the spirit and scope of the invention.

What is claimed is:

1. A system for supporting method level caching by a runtime machine, comprising:

a disk space of a computer system comprising at least one type of memory;

an operating system for controlling allocations and access within the disk space;

a runtime machine for running at least one application through at least one of the operating system and directly on at least one processor of the computer system, the runtime machine for managing a selected disk space from among the disk space allocated to the runtime machine by the operating system and for managing a separate method cache within the selected disk space limited to storing at least one result of at least one method of a plurality of methods of the application for access for a next instance of the at least one method during runtime of the application, wherein the separate method cache is separate from an application heap managed by the runtime machine for the application within the selected disk space;

the runtime machine for accessing at least one argument object graph and a result object graph for each method of the plurality of methods of the application to determine whether a size of the at least one argument object graph and the result object graph exceeds a maximum graph size for the method cache;

the runtime machine, responsive to the size of the at least one argument object graph and the result object graph exceeding the maximum graph size for the method cache, for marking the particular method to direct the runtime machine not to cache the separate result of the particular method in the method cache;

the runtime machine, responsive to the size of the at least one argument object graph and the result object graph not exceeding the maximum graph size for the method cache, analyzing the at least one argument object graph and result object graph for the particular method to determine whether each separate at least one argument object graph and result object graph for the particular method comprises only primitive object types, wherein as the runtime machine traverses each node of each of the at least one argument object graph and result object graph the runtime machine updates a current traversal time since the start of traversing the at least one argument object graph and result object graph and updates an estimated traversal time remaining for traversing the at least one argument object graph and result object graph based on a number of paths remaining in the at least one argument object graph and result object graph;

the runtime machine, responsive to detecting that at least one of the current traversal time and the estimated traversal time exceed a maximum analysis time, halting the analysis of the particular method and marking the particular method to direct the runtime machine not to cache a separate result of the particular method in the method cache;

the runtime machine, responsive to detecting that a particular at least one argument object graph and result object graph of a particular method from among the plurality of methods comprises only primitive object types, and the current traversal time or estimated traversal time does not exceed a maximum analysis time, for marking the particular method to direct the runtime machine to cache the separate result of the particular method in the method cache.

2. The system according to claim 1, further comprising:

the runtime machine for compiling the source code of the application into bytecode for a controller to execute at runtime;

the runtime machine for generating the at least one object graph and the result object graph for each method of the application when compiling the source code; and the runtime machine, responsive to detecting the particular at least one object graph and result object graph for the particular method comprises only primitive object types, for marking the particular method within the bytecode as cache capable to direct the controller to cache the separate result of the particular method in the method cache at runtime.

3. The system according to claim 1, further comprising:

the runtime machine for accessing, at runtime of the application, the particular at least one object graph and result graph from live object graphs generated for the particular method.

4. The system according to claim 1, further comprising:

the runtime machine for detecting non-primitive object types for the method if the runtime machine detects within the at least one argument object graph and result object graph at least one of a file access stream, a keyboard input or output object, a screen input or output object, an object that accesses a separate process, and an object that accesses the disk space not allocated to the runtime machine.

5. The system according to claim 1, further comprising:

the runtime machine for analyzing each method by traversing a plurality of nodes of the at least one argument object graph and at least one result object graph for each method and detecting whether each of the nodes represents a primitive object type, wherein each of the plurality of nodes belongs to a separate one of a plurality of levels, wherein each level of nodes is searched before a next level of nodes from among the plurality of levels is searched.

6. The system according to claim 1, further comprising;

the runtime machine for supporting a user interface displaying an identifier for the particular method currently under analysis and a plurality of selectable options;

the runtime machine for receiving user selections from the plurality of selectable options comprising a first selection to halt analysis of the particular method and mark the particular method as not cache capable for the method cache, a second selection to continue analysis of the particular method beyond the maximum analysis time, and a third selection to designate the particular method to be cached in the method cache.

7. A method for supporting method level caching by a runtime machine, comprising:

managing a selected disk space from among the disk space allocated to the runtime machine by an operating system and managing a separate method cache within the selected disk space limited to storing at least one result of at least one method of a plurality of methods of the application for access for a next instance of the at least one method during runtime of the application, wherein the separate method cache is separate from an application heap managed by the runtime machine for the application within the selected disk space;

running, by the runtime machine, the application through at least one of the operating system and directly on at least one processor of the computer system;

accessing, by the runtime machine, at least one argument object graph and a result object graph for each method of the plurality of methods of the application to determine whether a size of the at least one argument object graph and the result object graph exceeds a maximum graph size for the method cache;

responsive to the size of the at least one argument object graph and the result object graph exceeding the maximum graph size for the method cache, marking, by the runtime machine, the particular method to direct the runtime machine not to cache the separate result of the particular method in the method cache;

responsive to the size of the at least one argument object graph and the result object graph not exceeding the maximum graph size for the method cache, analyzing, by the runtime machine, the at least one argument object graph and result object graph for the particular method to determine whether each separate at least one argument object graph and result object graph for the particular method comprises only primitive object types, wherein as the runtime machine traverses each node of each of the at least one argument object graph and result object graph the runtime machine updates a current traversal time since the start of traversing the at least one argument object graph and result object graph and updates an estimated traversal time remaining for traversing the at least one argument object graph and result object graph based on a number of paths remaining in the at least one argument object graph and result object graph;

responsive to detecting that at least one of the current traversal time and the estimated traversal time exceed a maximum analysis time, halting, by the runtime machine, the analysis of the particular method and marking the particular method to direct the runtime machine not to cache a separate result of the particular method in the method cache;

responsive to the runtime machine detecting that a particular at least one argument object graph and result object graph of a particular method from among the plurality of methods comprises only primitive object types, and the current traversal time or estimated traversal time does not exceed a maximum analysis time, marking, by the runtime machine the particular method to trigger caching the separate result of the particular method in the method cache.

8. The method according to claim 7, further comprising:

compiling, by the runtime machine, the source code of the application into bytecode for a controller to execute at runtime;

generating the at least one object graph and the result object graph for each method of the application when compiling the source code; and responsive to detecting the particular at least one object graph and result object graph for the particular method comprises only primitive object types, marking the particular method within the bytecode as cache capable to direct the controller to cache the separate result of the particular method in the method cache at runtime.

9. The method according to claim 7, further comprising:

accessing, at runtime of the application, the particular at least one object graph and result graph from live object graphs generated for the particular method.

10. The method according to claim 7, further comprising:

detecting non-primitive object types for the method if the runtime machine detects within the at least one argument object graph and result object graph at least one of a file access stream, a keyboard input or output object, a screen input or output object, an object that accesses a separate process, and an object that accesses the disk space not allocated to the runtime machine.

11. The method according to claim 7, further comprising:
analyzing each method by traversing a plurality of nodes of the at least one argument object graph and at least one result object graph for each method and detecting whether each of the nodes represents a primitive object type, wherein each of the plurality of nodes belongs to a separate one of a plurality of levels, wherein each level of nodes is searched before a next level of nodes from among the plurality of levels is searched.

12. The method according to claim 7, further comprising:
supporting a user interface displaying an identifier for the particular method currently under analysis and a plurality of selectable options;
receiving user selections from the plurality of selectable options comprising first selection to halt analysis of the particular method and mark the particular method as not cache capable for the method cache, a second selection to continue analysis of the particular method beyond the maximum analysis time, and a third selection to designate the particular method to be cached in the method cache.

13. A program product comprising a storage-type computer-usable medium including a computer-readable program for supporting method level caching by a runtime machine, wherein the computer-readable program when executed on a computer causes the computer to:
manage a selected disk space from among the disk space allocated to the runtime machine by an operating system and managing a separate method cache within the selected disk space limited to storing at least one result of at least one method of a plurality of methods of the application for access for a next instance of the at least one method during runtime of the application, wherein the separate method cache is separate from an application heap managed by the runtime machine for the application within the selected disk space;
run the application through at least one of the operating system and directly on at least one processor of the computer system;
access at least one argument object graph and a result object graph for each method of the plurality of methods of the application to determine whether a size of the at least one argument object graph and the result object graph exceeds a maximum graph size for the method cache;
responsive to the size of the at least one argument object graph and the result object graph exceeding the maximum graph size for the method cache, mark the particular method to direct the runtime machine not to cache the separate result of the particular method in the method cache;
responsive to the size of the at least one argument object graph and the result object graph not exceeding the maximum graph size for the method cache, analyze the at least one argument object graph and result object graph for the particular method to determine whether each separate at least one argument object graph and result object graph for the particular method comprises only primitive object types, wherein as the runtime machine traverses each node of each of the at least one argument object graph and result object graph the runtime machine updates a current traversal time since the start of traversing the at least one argument object graph and result object graph and updates an estimated traversal time remaining for traversing the at least one argument object graph and result object graph based on a number of paths remaining in the at least one argument object graph and result object graph;
responsive to detecting that at least one of the current traversal time and the estimated traversal time exceed a maximum analysis time, halt the analysis of the particular method and mark the particular method to direct the runtime machine not to cache a separate result of the particular method in the method cache;
responsive to detecting that a particular at least one argument object graph and result object graph of a particular method from among the plurality of methods comprises only primitive object types, and the current traversal time or estimated traversal time does not exceed a maximum analysis time, mark the particular method to trigger caching the separate result of the particular method in the method cache.

14. The program product of claim 13, wherein said computer-readable program is transmitted over a network.

15. The program product according to claim 13, wherein the computer-readable program when executed on the computer further causes the computer to:
analyze each method by traversing a plurality of nodes of the at least one argument object graph and at least one result object graph for each method and detecting whether each of the nodes represents a primitive object type, wherein each of the plurality of nodes belongs to a separate one of a plurality of levels, wherein each level of nodes is searched before a next level of nodes from among the plurality of levels is searched.

16. The system of claim 1, further comprising:
the runtime machine for analyzing each method by traversing a plurality of nodes of the at least one argument object graph and result object graph for the particular method and detecting whether each of the nodes represents the primitive object type;
the runtime machine for recording, as the plurality of nodes are traversed, a history table for the at least one argument object graph and result object graph for the particular method comprising a separate record for each node specifying an identifier for each node traversed from among the plurality of nodes and specifying whether each node comprises a primitive object type or non-primitive object type; and
displaying the history table in a user interface with an identifier for the particular method currently under analysis.

17. The method of claim 7, further comprising:
analyzing, by the runtime machine, each method by traversing a plurality of nodes of the at least one argument object graph and result object graph for the particular method and detecting whether each of the nodes represents the primitive object type;
recording, by the runtime machine, as the plurality of nodes are traversed, a history table for the at least one argument object graph and result object graph for the particular method comprising a separate record for each node specifying an identifier for each node traversed from among the plurality of nodes and specifying whether each node comprises a primitive object type or non-primitive object type; and
displaying, by the runtime machine, the history table in the user interface with an identifier for the particular method currently under analysis.

* * * * *